Oct. 7, 1958 C. W. HOOVER, JR 2,855,539

LIGHT POSITION INDICATING SYSTEM

Filed April 27, 1956 2 Sheets-Sheet 1

INVENTOR
C. W. HOOVER, JR.
BY
[signature]
ATTORNEY

Oct. 7, 1958 C. W. HOOVER, JR 2,855,539

LIGHT POSITION INDICATING SYSTEM

Filed April 27, 1956 2 Sheets-Sheet 2

INVENTOR
C. W. HOOVER, JR.
BY [signature]
ATTORNEY

United States Patent Office 2,855,539 Patented Oct. 7, 1958

2,855,539

LIGHT POSITION INDICATING SYSTEM

Charles W. Hoover, Jr., Summit, N. J., assignor to Bell Telephone Laboratories, Incorporated, New York, N. Y., a corporation of New York Application April 27, 1956, Serial No. 581,072

19 Claims. (Cl. 315—8.5)

Figure 1:
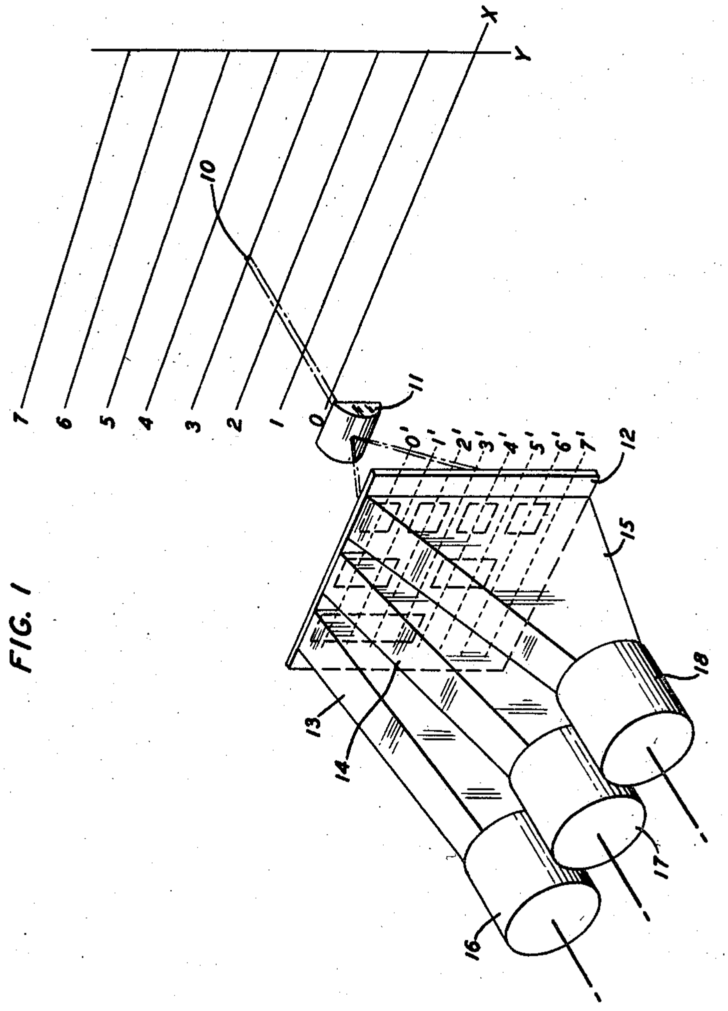

This invention relates to information handling and storage systems and more particularly to such systems employing light beams and the positioning of such beams at a discrete planar location.

Information is frequently encoded in digital form to attain high speed operation and precise results as well as versatility in the apparatus required. The binary system is one common digital system used for handling numbers and other forms of information. Such a system provides two stable conditions; the existence of one or the other condition represents one or the other of the binary digits one and zero. Common examples of such binary system devices are conduction and nonconduction in an electron tube, opposite conditions of magnetic polarity, or transmission or nontransmission of an electron beam or light beam through a coded plate.

It frequently is necessary in information handling systems to position an electron beam in a cathode ray tube precisely so as to impinge a single discrete area of an information storage surface, which surface may comprise of the order of a million discrete storage areas. In such systems it is necessary to use initial positioning elements which respond to the analog representations of digital encoded input information to position the electron beam. Such digital-to-analog converters have proven unreliable in many instances and too complex and costly to merit usage as the sole positioning means in large scale rapid access storage devices. In addition, the accuracy achieved through the sole use of this positioning means provides no assurance that the desired position is attained. Thus it is desirable to include some means for ascertaining the exact beam position after initial positioning is accomplished and to provide means for correcting the beam position if it is found that the initial position is erroneous. Inasmuch as such a system utilizes encoded information for initial positioning, it is advantageous to procure the exact beam position in encoded form as well.

One storage system wherein accurate positioning of an electron beam is required is that known as the flying spot store and described in application Serial No. 541,195, filed October 18, 1955, of R. C. Davis and R. E. Staehler, now Patent 2,830,285, issued April 8, 1958. In a system as disclosed in that application, information is stored on photographic plates in the form of transparent and opaque areas, each area representing a binary code bit of information. The storage plates are positioned in front of a cathode ray tube having a luminescent surface such that the electron beam, directed to a discrete area of the luminescent surface, forms a spot source of light which spot is in turn focused on one of the discrete areas of one or more storage plates. A light sensitive device behind the storage plate converts light passing through the storage plate into electrical signals and passes the signals to an output circuit.

In order to attain the exacting requirements of beam positioning in such a system for rapid and precisely accurate positioning of the focused light spot onto any one of the discrete areas of the storage slide, an optical feedback positioning system may be employed. The optical feedback system set forth in the Davis-Staehler application comprises positioning slides having alternate opaque and nonopaque bands. By means of a feedback loop between a single photosensitive device positioned behind each of these positioning slides and the cathode ray deflection plates, the beam could be made to fall on a boundary line between an opaque and a nonopaque band of each positioning slide, which position assures proper positioning of the beam on the desired discrete information storage area. The amount of light passing through a nonopaque band causes an electrical signal of proportionate size to be produced by the photo-sensitive device. This signal is compared with a reference signal proportionate to the amount of light which should pass through the nonopaque band to position the beam on the borderline with an opaque band. The beam is repositioned by the feedback from the signal comparing means until the output and reference signal are at the same level.

As disclosed in my application Serial No. 573,896, filed March 26, 1956, a pair of beam positioning slides may be utilized having horizontal or vertical bands of polarized or color filter material. Further, as disclosed in application Serial No. 573,989, filed March 26, 1956, of R. W. Ketchledge, now Patent 2,834,005, issued May 6, 1958, increased storage may be attained if the opaque and nonopaque discrete areas on the storage plates are of different color filter materials.

In the above beam positioning systems for flying spot storage systems, the beam is positioned initially and then repositioned by the optical feedback arrangement in comparison with a reference signal and not in comparison with the initial deflection information itself. Accordingly an additional positioning plate, referred to as the final address check slide, is utilized to provide a comparison of the final beam position with the input information for a selected address area. Further, as the positioning is caused by a signal generated on the scanning of the beam over a portion of the tube face, rather than initially on the appearance of the beam at the surface, accurate positioning is attained for a selected address area rather than for a particular discrete storage area.

It is frequently desirable, also, to obtain a virtually instantaneous as well as accurate description of a deflected beam position, both in storage systems as described above and in other systems. Thus in pulse height analysis of the pulses from counters on scintillation crystals, for example, very little pulse height data can be procured due to the limited acquisition speeds of presently utilized pulse height analyzers when rapidly decaying materials are studied. By driving the deflection plates of a cathode ray tube directly from the amplified scintillator pulses, considerably increased analysis speed can be realized by obtaining and recording a description of each deflected beam position in digital encoded form.

Additionally, in devices defining a location in terms of a light spot on a plane surface, such as in radar, an immediate and precise description of the planar coordinates of the light spot is desirable.

Accordingly, it is an object of this invention to define the angular deflection of an electron beam in digital encoded form.

It is another object of this invention to define the planar position of a light source in digital encoded form. Further, it is an object of this invention to obtain a description of each planar coordinate of the location of a point source of light.

It is another object of this invention to improve the positioning of an electron beam of a cathode ray tube. Thus it is an object of this invention to provide beam positioning means which are rapid, accurate, reliable, simple in operation, and economical in construction.

It is a still further object of this invention to provide an improved optical feedback beam positioning system for a flying spot storage system. More specifically it is an object of this invention to reduce the number of light plates or slides required for beam positioning in a flying spot store, to enable accurate positioning of the light beam at a single discrete storage area, and to decrease the time required for such beam positioning.

These and other objects of this invention are achieved in accordance with illustrative embodiments of this invention wherein light from a point source of light is focused on a code plate employing rows of opaque and nonopaque areas, each of which rows defines a binary code number. Each digit position of a number is defined by the presence or absence of a nonopaque area in the plate. Corresponding digit positions in each row form columns of digit representations, so that the first digit positions of each row, for example, form a first column. The number of columns employed in the plate determines the number of digits in the binary numbers of each row. The opaque and nonopaque areas in the plate are so arranged that each row defines a different binary number. Light guides are employed to confine the light focused on the plate to one of the coded rows and to spread the light so as to encompass all of the digit positions in the row. A light sensitive device is provided for each column of the code plate, and provision is made to allow light passing through nonopaque areas in a column of the code plate to strike only the corresponding light sensitive device. Thus light focused on a row of the code plate will pass through certain digit positions therein and be picked up by the corresponding light sensitive devices which in turn will provide electrical signals corresponding in parallel binary code form to the number "written" in binary code form in that particular row of the code slide. The resultant electrical signals may be recorded in some suitable fashion to indicate a planar coordinate of the position of the light source.

Movement of the light source to a position above or below the plane of the first established coordinate position will result in the focusing of the light from the source on a different row of the code plate and a readout of a different binary number in parallel form from the light sensitive devices corresponding to the new coordinate position of the light source.

In one specific illustrative embodiment of this invention, the source of light employed is the spot formed on the luminescent screen of a cathode ray tube by impingement of the tube's electron beam. Application of analog values of binary code numbers to the deflection plates of the tube serves to drive the beam so as to impinge any selective discrete area or "address" on the luminescent screen. Considering the screen as a planar surface, each address location on the screen may be defined by the planar coordinates of the light spot location. Thus the height of the deflected beam may be determined by defining the horizontal coordinate of the light spot in the plane of the luminescent screen. Similarly the beam deflection along the horizontal axis may be determined by defining the vertical coordinate of the light spot in the plane of the screen.

A lens system is positioned between the cathode ray tube screen and the code plate such that light emanating from the light spot on the screen is focused on a row of the code plate. Light passing through this row will be picked up by photosensitive devices and converted to electrical impulses therein indicative of a coordinate of the planar position of the light spot; i. e., the angular deflection in one plane of the electron beam of the cathode ray tube. Such signals may be utilized, for example, in a flying spot store to determine the accuracy of original beam deflection by comparing these signals with the original deflection signals; such comparison may utilize the binary number comparison circuits of applications of R. W. Ketchledge, Serial Nos. 581,174 and 581,175, both filed April 27, 1956. The output signals may also be recorded to provide data indicating the amplitude of various input pulses to the cathode ray tube, useful in pulse height analysis, for example.

In a specific embodiment of this invention as may be employed in a flying spot store, a second code plate having rows and columns of opaque and nonopaque areas is employed. The first and second code plates both face the focused rays of light from the source, but the second plate is in effect rotated 90 degrees so that a column of the second plate corresponds to a row of the first plate. Light emanating from the given light source is focused on the second code plate so as to confine it to a particular column and spread it over the length of the column. Additional light sensitive devices are employed, one corresponding to each row of the second plate such that all light passing through a particular row of the second plate is concentrated on a corresponding light sensitive device. Thus light focused on a column of the second code plate will pass through each nonopaque area in that column and be picked up by the light sensitive devices corresponding to the rows of the second code plate. The light sensitive devices in turn will provide electrical signals corresponding in parallel binary code form to the number "written" in binary code form in that particular column of the code plate. The resultant electrical signals will indicate a second planar coordinate of the light source position 90 degrees removed from the first recorded planar coordinate. By focusing light from the source simultaneously on both code plates, the exact planar position of the light source can be obtained.

Movement of the light source to a new planar position displaced from either coordinate of the original position, will result in the focusing of light from the source on a different row of the first code plate and a different column of the second code plate, and a readout of binary code numbers corresponding to the coordinates of the new light source position, is immediately obtained.

The nonopaque areas or windows in the code plates, as described for illustrative embodiments of this invention, should be considered in the broad sense of any area of the plate through which light may pass in a form best utilized by the light sensitive devices. Thus transparent material in a plate of otherwise opaque material may constitute the nonopaque areas in the plate, as may filter or polarizing material or an absence of material.

The focusing means may advantageously comprise a cylindrical lens system arranged to form a ribbon beam, although any means for confining the light from a spot or point source to a particular plane and extending the light over the breadth of the plane so as to strike a plurality of discrete areas in one or more code plates, or for confining the light to a plurality of channels so as to strike a discrete area in each of a plurality of code plates, will satisfy this requirement.

It is therefore one feature of this invention that light from a point source be focused on discrete areas of one or more code plates and that light passing through the plates impinge on light sensitive devices to provide electrical signals corresponding to the particular coded message written in those discrete areas of the code plates.

It is another feature of this invention that light from a source be confined substantially to a given plane, extended in the given plane and focused on a code plate, and that light passing through the code plate be converted to electrical signals equivalent to a binary code number indicative of one planar coordinate of the light source position.

Figure 2:
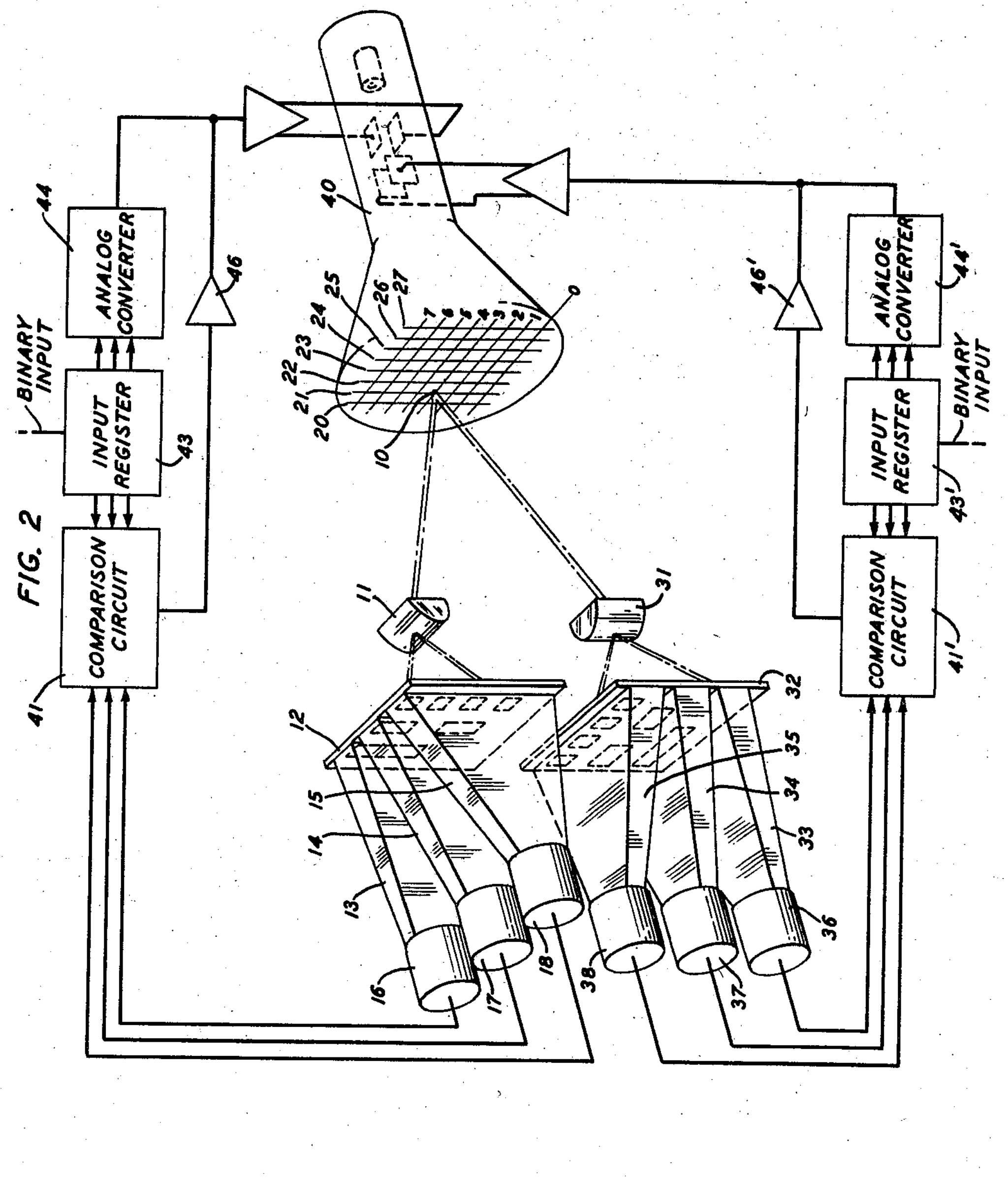

It is a further feature of this invention that first and second plates, each having rows and columns of opaque and nonopaque areas therein, be utilized with light from the source being focused simultaneously on a row of the first plate and a column of the second plate, and that beam. A binary input address applied to and stored in an input register 43 or 43' is converted to a suitable analog value by an analog converter 44 or 44' to drive the deflection plates of cathode ray tube 40 so as to deflect the electron beam of the tube 40 to the desired address position. The planar coordinates of the resultant light spot on the luminescent screen of the tube are read out in parallel binary code form from the array of light sensitive devices for each coordinate and applied to the comparison circuits 41 and 41'. The input address for each coordinate is also applied in parallel binary code form to the comparison circuits 41 and 41' as shown in Fig. 2. The resultant of the comparison for each coordinate is applied through amplifiers 46 and 46' to the corresponding deflection plates of the cathode ray tube 40 to reposition the electron beam. The comparison circuits may be of the type disclosed in the applications of R. W. Ketchledge, Serial Nos. 581,174 and 581,175, both filed April 27, 1956, depending upon the binary codes employed.

Such a beam positioning system, in accordance with this invention, may readily be utilized in flying spot storage systems of the types disclosed in the above mentioned applications, wherein information storage plates are also positioned in front of the cathode ray tube 40 and additional optical devices serve to focus pencil or point beams of light from the surface of the cathode ray tube onto the discrete storage areas of the storage plates. The comparison circuits 41 and 41' provide positive or negative signals depending upon whether the binary signals from the code plates or the input deflection signals are larger, i. e., whether the light beam on the code plates 12 and 32 is above or below the proper code. As confirmation or repositioning of the electron beam occurs for each individual spot of light at the tube surface, the address of each discrete bit of information on an information storage plate may be checked, rather than the address of a block or group of such signals. Further because the checking and beam positioning is on a digital basis, using comparison of binary code signals, the stability requirements of the beam deflection voltages are considerably reduced.

Reference is made to application Serial No. 581,073, filed April 27, 1956, of C. W. Hoover and R. W. Ketchledge wherein a related invention is disclosed and claimed.

It is to be understood that the above described arrangements are illustrative of the application of the principles of the invention. Numerous other arrangements may be devised by those skilled in the art without departing from the spirit and scope of the invention.

What is claimed is:

1. Apparatus for identifying one coordinate of a discrete position on a surface in terms of binary encoded signals comprising a point source of light at said discrete position, first code plate means having a plurality of rows and columns of opaque and nonopaque areas therein, optical means for obtaining a light beam of ribbonlike configuration from said point source of light and focusing said light beam on one of said rows of said first code plate means, and a plurality of light sensitive devices each positioned to receive light transmitted through nonopaque areas in a corresponding one of said columns of said first code plate means and responsive to receipt of light to generate electrical impulses in parallel binary form.

2. Apparatus in accordance with claim 1 and further comprising means for identifying a second coordinate of said discrete position including second code plate means having a plurality of rows and columns of opaque and nonopaque areas therein, other optical means for obtaining a light beam of ribbonlike configuration from said point source of light substantially in a plane angularly displaced from the plane of the ribbon beam produced by said first mentioned optical means and focusing said light beam on one of said columns in said second code plate means, a plurality of light sensitive devices each positioned to receive light transmitted through nonopaque areas in a corresponding one of said rows of said second code plate means and responsive to receipt of light to generate electrical impulses in parallel binary form.

3. Apparatus for defining the location on a surface of a point source of light in terms of binary encoded signals comprising means for forming a light spot on said surface, slide means having a first plurality of discrete light transmitting areas arranged in first rows and first columns therein, each of said first rows forming the equivalent of a binary code number, first means for focusing light from said light spot on one of said first rows, a first plurality of light sensitive devices each positioned to receive light transmitted through a corresponding one of said first columns and responsive to receipt of light to generate electrical impulses in parallel binary form equivalent to a first coordinate of said light spot position, a second plurality of discrete light transmitting areas arranged in second rows and second columns in said slide means, each of said second columns forming the equivalent of a binary code number, second means for focusing light from said light spot on one of said second columns, a second plurality of light sensitive devices each positioned to receive light transmitted through a corresponding one of said second rows and responsive to receipt of light to generate electrical impulses in parallel binary form equivalent to a second coordinate of said light spot position.

4. Apparatus for defining the planar location of a source of light comprising slide means having distinct first and second groups of opaque and nonopaque areas therein, said first and second groups each arranged in a plurality of rows and columns, means for focusing light from said source simultaneously on a selected one of said first group rows and on a selected one of said second group columns, a first group of light sensitive devices each positioned to receive light through nonopaque areas in a corresponding one of said first group columns, and a second group of light sensitive devices each positioned to receive light through nonopaque areas in a corresponding one of said second group rows, said first and second groups of light sensitive devices responsive to the receipt of light to generate signals in parallel binary code form defining coordinates of said light source location.

5. Apparatus for defining the planar location of a source of light in terms of binary encoded signal messages comprising slide means containing discrete areas of first and second types indicated by one of two light transmission levels, said slide means having distinct first and second groups of said discrete areas arranged in mutually parallel rows and mutually parallel columns perpendicular to said rows, means for focusing light from said source only on a selected one of said first group rows and a selected one of said second group columns, a first group of light sensitive devices each positioned to receive light through digit areas of said first type in a corresponding one of said first group columns, and a second group of light sensitive devices each positioned to receive light through digit areas of said first type in a corresponding one of said second group rows, said first and second groups of light sensitive devices responsive to the receipt of light to generate signals in parallel binary code form defining coordinates of said light source location.

6. Apparatus in accordance with claim 5 wherein said focusing means comprises first and second lens means, said first lens means adapted to concentrate light received from said source substantially in a first plane and to expand said light in said first plane, and said second lens means adapted to confine said light in a second plane perpendicular to said first plane and to expand said light in said second plane.

7. Apparatus in accordance with claim 6 wherein said slide means comprises a first slide positioned between sadi first lens means and said first group of light sensitive devices, and a second slide positioned between said second lens means and said second group of light sensitive light sensitive devices be arranged to receive light from corresponding columns in the first plate and corresponding rows in the second plate.

It is a further feature of this invention that a beam positioning system for a cathode ray tube include a pair of code plates, optical means for focusing a flat or ribbon beam of light across the code plates, and a feedback path from photosensitive devices positioned behind the code plates to the deflection plates of the cathode ray tube, the feedback path including a comparison circuit for comparing the beam position, as indicated by the electrical signals from the code plates, with the original input signals to the cathode ray tube. In accordance with this feature of the invention the cathode ray tube may be utilized, together with information storage slides, in a flying spot storage system.

A complete understanding of this invention and of the various features thereof, may be gained from consideration of the following detailed description and the acccompanying drawing, in which:

Fig. 1 is a schematic representation of one illustrative embodiment of this invention; and Fig. 2 is a schematic representation of a beam positioning system for a cathode ray tube incorporating the embodiment of Fig. 1.

Referring now to Fig. 1, the specific illustrative embodiment of this invention shown comprises a light source 10, a lens system 11, a code plate 12, light directing means 13, 14 and 15 and light sensitive devices 16, 17 and 18. For convenience in this description, the light source 10 is located in a plane in which eight levels parallel to the horizontal coordinate of the plane are designated 0–7. It is noted that the light source 10 in Fig. 1 is located on level 3 of this plane.

Code plate 12 has opaque and nonopaque areas arranged in a pattern such that eight rows and three columns thereof contain the eight three-digit binary code numbers corresponding to the decimal system numbers 0–7. As stated hereinbefore, a digit of a binary code number may be indicated by the transmission or nontransmission of a light beam through a discrete area in a plate. For example, the number 3 in the decimal system is written in the conventional binary code system as 011. Designating a "0" as a nontransmitting (opaque) area and a "1" as a transmitting (nonopaque) area in the code plate 12, it will be noted that a line 4′ through the fifth row from the top of plate 12 encounters nonopaque areas or windows in the second and third columns but not in the first column, thus indicating the binary code number 011. Similarly, a line 0′ through the top row of the code plate 12 encounters nonopaque areas in all three columns, thus indicating the binary code number 111.

The code plate may comprise a glass slide covered with a suitable photoemulsion and processed so as to present opaque and nonopaque areas representative of the two possible binary digit conditions. It may also comprise a metal plate having the areas equivalent to the nonopaque areas above punched out. Other variations of materials and degree of transparency may be employed. Additionally other binary codes, such as reflected binary or gray code, may be utilized.

Light through each column of opaque and nonopaque areas of code plate 12 is channeled to a corresponding one of the light sensitive devices 16, 17 or 18 via light directing means or pipes 13, 14 or 15. Such light directing means advantageously may comprise polymerized methyl methacrylate which material substantially confines light to a particular path according to its shape, thus permitting the placement of the light sensitive devices in any desired position in accordance with system design requirements and yet assuring that light passing through each column of the coded plate is delivered to the corresponding light sensitive device.

Any of the light sensitive devices known in the art such as phototubes or photoelectron multipliers may be utilized to receive the light from the light pipes 13, 14 and 15 and convert it into electrical signals in the light sensitive device output circuits.

It will first be assumed that the light source 10 is located on level 3 of the imaginary plane having X and Y coordinates as shown in Fig. 1. Light emanating from the source is concentrated substantially in a plane by the lens system 11 to form a line image of the light source. A single cylindrical lens or series of cylindrical lenses advantageously may be employed for this purpose. The distance between the lens system 11 and the light source 10 is set and the lens system oriented so that the line image formed is in focus on the surface of the code plate 12 substantially along the row 3′. Light is transmitted through the first column in the row 3′ of code plate 12 and directed by the light pipe 13 to the corresponding light sensitive device 16, which in turn provides an electrical output signal. Light is blocked by the code plate 12 in the second and third columns so that light sensitive devices 17 and 18 fail to produce output signals at this time. The resultant parallel output is "signal, no signal, no signal," corresponding to 100 of the binary code.

The lens system 11 is so oriented that the line image formed on the code plate 12 is at right angles to the Y axis of the imaginary plane shown. Thus movement of the light source to the level 6, for example, results in light striking a different preestablished row of code plate 12, row 6′ in this example, and a consequent production by the light sensitive devices of electrical signals representative of the binary code number 001. The code plate shown will provide a binary code representation of any of the levels 0–7 shown in Fig. 1. Increasing the number of binary digits utilized in the code plate permits an increase in the number of levels on the imaginary plane that the system may identify. Thus, utilizing a six-digit binary code permits the definition of 64 levels and a nine-digit binary code permits the definition of 512 levels. Also various codes may be employed such as conventional binary code, reflected binary code, etc.

Referring now to Fig. 2, a second coordinate system has been added to the single coordinate system of Fig. 1. The light source 10 as shown is now located on level 3 of horizontal levels 0–7 and vertical level 21 of vertical levels 20–27. A second lens system 31 is positioned so as to form a line image of light emanating from the source 10 in focus on the surface of code plate 32. The lens system in this instance is so oriented that the line image formed on the code plate 32 is at right angles to the X axis on the imaginary plane shown. Code plate 32 is coded in similar fashion to code plate 12 but is in effect rotated 90 degrees so that a row in the latter corresponds to a column in the former. Each of the light pipes 33–35 is arranged so as to direct light from a row of code plate 32 to a corresponding one of the light sensitive devices 36–38. If desired light from the spot 10 on the surface of the tube 40 may be split by a half silvered mirror and projected, by projection lens or lenses, to cylindrical lenses 11 and 31.

Light from the source 10 in the position shown in Fig. 2 will be focused substantially on the second column of code plate 32 corresponding to vertical level 21 which will result in a signal from light sensitive device 37 but no signal from devices 36 or 38, thereby providing in parallel form the binary code number 010. The system for the opposite coordinate will read out the binary number 101 at the same time, indicating in this instance that the light source is at the second vertical level and the fourth horizontal level of the imaginary plane shown in Fig. 2. Movement of the light source horizontally will shift the focus of the beam by lens system 31 on code plate 32 to permit readout of the new coordinate position.

Fig. 2 also shows the application of this specific embodiment to the positioning of a cathode ray tube electron devices, said first slide containing said first group of digit areas and said second slide containing said second group of digit areas.

8. Apparatus in accordance with claim 6 wherein said first and second lens means each comprise a cylindrical lens.

9. Apparatus in accordance with claim 5 and further comprising light channeling means positioned between each of said light sensitive devices and said corresponding one of said first group columns or second group rows of said slide means, said light channeling means disposed to direct substantially all of the light passing through said digit areas to said light sensitive devices.

10. In combination, apparatus for defining a planar position comprising a point source of light, slide means having a group of opaque and nonopaque areas therein, said areas arranged in a plurality of rows and columns, means for focusing light from said point source on a selected one of said rows, and light sensitive devices each positioned to receive said focused light through nonopaque areas in a corresponding one of said columns and responsive to the receipt of light to generate signals in binary code form defining one coordinate of said planar position.

11. The combination of claim 10 wherein said focusing means comprises lens means adapted to concentrate light received from said source substantially in a first plane and to expand said light over the breadth of said plane.

12. The combination of claim 11 wherein said lens means comprises a cylindrical lens.

13. The combination of claim 10 wherein said slide means has a second group of opaque and nonopaque areas therein arranged in a plurality of rows and columns, said focusing means further comprising means for focusing light from said source on one of said second group columns, light sensitive devices positioned to receive light through nonopaque areas in a corresponding one of said second group rows and responsive to the receipt of light to generate signals in binary form defining the other coordinate of said light source planar location.

14. A positioning system comprising an electron discharge device including a luminescent surface, means for projecting an electron beam against said surface and means for deflecting said beam to form a light spot at a discrete area of said surface, a code plate having a plurality of rows and columns of opaque and nonopaque areas therein, means for focusing light from said light spot on one of said rows in said code plate, a plurality of light sensitive devices each positioned to receive light through nonopaque areas in a corresponding one of said columns and responsive to the receipt of light to generate electrical impulses in parallel binary code form, means for applying deflection signals to said deflection means to initially position the electron beam in one coordinate on said surface, means for comparing said deflection signals with said generated electrical impulses and means for applying signals to said deflection means from said comparison means to correct the position of said electron beam in one coordinate on said surface.

15. A positioning system in accordance with claim 14 wherein said focusing means comprises lens means adapted to concentrate light received from said source substantially in a first plane and to spread said light over the breadth of said plane.

16. A positioning system in accordance with claim 15 wherein said lens means comprises a cylindrical lens.

17. A positioning system in accordance with claim 14 and further comprising light channeling means positioned between each of said light sensitive devices and said corresponding one of said columns, said light channeling means disposed to direct substantially all of the light passing through one of said columns to said corresponding light sensitive devices.

18. A positioning system in accordance with claim 14 and further comprising a second code plate having a plurality of rows and columns of opaque and nonopaque areas therein, means for focusing light from said light spot on one of said columns in said second code plate, a plurality of light sensitive devices each positioned to receive light through nonopaque areas in a corresponding one of said rows in said second code plate and responsive to the receipt of light to generate a second group of electrical impulses in parallel binary code form, means for applying deflection signals to said deflection means initially to position the electron beam in a second coordinate on said surface, means for comparing said second coordinate deflection signals with said second group of electrical impulses and means for applying signals to said deflection means from said comparison means to correct the position in said second coordinate of said electron beam on said surface.

19. Apparatus for determining the position of an electron beam in a cathode ray tube in response to binary input deflection signals comprising an input register to which said input signals are applied, a cathode ray tube having deflection plates and a luminescent surface, means for projecting an electron beam against said surface, an analog converter connected between said input register and said deflection system, code plate means having rows and columns of light transmitting and non-transmitting areas, optical means for focusing a spot of light on said tube surface into a flat beam of light impinging one of said columns, light sensitive means positioned behind each of said rows for receiving light from the transmitting areas of said rows and generating coded electrical signals depending upon the column of said plate on which said light impinges, comparison circuit means connected to said light sensitive means and said input register for comparing the coded output of said light sensitive means with said binary input deflection signals in said input register, and means for applying the output of said comparison circuit means to said deflection plates to correct the position of said spot of light on said tube surface.

References Cited in the file of this patent

UNITED STATES PATENTS

| | | |
|---|---|---|
| 2,402,058 | Loughren | June 11, 1946 |
| 2,505,069 | Savino | Apr. 25, 1950 |
| 2,525,475 | Boykin et al. | Oct. 10, 1950 |
| 2,604,534 | Graham | July 22, 1952 |
| 2,694,154 | Kingsbury | Nov. 9, 1954 |
| 2,733,358 | Carapellotti | Jan. 31, 1956 |